United States Patent
Seo et al.

(10) Patent No.: US 7,921,254 B2
(45) Date of Patent: Apr. 5, 2011

(54) WIRELESS UNIVERSAL SERIAL BUS SYSTEM AND DRIVING METHOD THEREOF

(75) Inventors: Chang-Woo Seo, Suwon-si (KR);
Jun-Seo Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 80 days.

(21) Appl. No.: 12/320,788

(22) Filed: Feb. 4, 2009

(65) Prior Publication Data

US 2009/0204737 A1    Aug. 13, 2009

(30) Foreign Application Priority Data

Feb. 4, 2008    (KR) .................. 10-2008-0011195

(51) Int. Cl.
*G06F 13/00* (2006.01)
(52) U.S. Cl. ........................................ 710/313
(58) Field of Classification Search .................. 710/313
See application file for complete search history.

(56) References Cited

U.S. PATENT DOCUMENTS

| | | | |
|---|---|---|---|
| 2007/0213012 A1* | 9/2007 | Marin et al. | 455/63.3 |
| 2007/0260801 A1* | 11/2007 | Kwak et al. | 710/305 |
| 2007/0300004 A1* | 12/2007 | Yun | 710/313 |
| 2009/0089476 A1* | 4/2009 | Oh et al. | 710/305 |
| 2009/0129368 A1* | 5/2009 | Aoki | 370/350 |
| 2010/0027523 A1* | 2/2010 | Chan et al. | 370/345 |

FOREIGN PATENT DOCUMENTS

| | | |
|---|---|---|
| JP | 2007-019604 | 1/2007 |
| KR | 10-2007-0005515 | 1/2007 |
| KR | 10-0675841 | 1/2007 |
| KR | 10-0725932 | 5/2007 |

* cited by examiner

*Primary Examiner* — Glenn A Auve
(74) *Attorney, Agent, or Firm* — Harness, Dickey & Pierce, P.L.C.

(57) ABSTRACT

Disclosed is a wireless universal serial bus system that includes a device; a first host communicating with the device according to a wireless universal serial bus protocol; and a second host communicating with the device according to a wireless universal serial bus protocol, wherein when the first host receives a beacon from the second host, the first host provides new host information read out from the beacon to the device.

20 Claims, 7 Drawing Sheets

WIRELESS UNIVERSAL SERIAL BUS SYSTEM AND DRIVING METHOD THEREOF

PRIORITY STATEMENT

This application claims priority under 35 U.S.C §119 to Korean Patent Application No. 10-2008-0011195 filed on Feb. 4, 2008, in the Korean Intellectual Property Office (KIPO), the entire contents of which is incorporated herein by reference.

BACKGROUND

1. Field

Example embodiments relate to a wireless universal serial bus (WUSB). More particularly, example embodiments relate to a system and a method capable of enabling a plurality of hosts to access one device within a WUSB protocol.

2. Description of the Related Art

In a wireless communications network a wireless interface is needed to connect network devices. Wireless interfaces e.g. Infrared Data Association (IrDA) and Bluetooth, have been applied by current wireless devices. Recently, research has been advanced that enables the conventional wired network known as universal serial bus (USB) to be used by wireless networks to connect wireless devices. This new technology is known as a wireless universal serial bus (WUSB).

USB is a type of a serial port. It is a standardized wired interface developed to connect a computer with peripheral devices e.g. mouse, printer, modem and speaker. Because USB may have more advantages than other wired interfaces, it has been widely applied to standard personal computer equipment. Recently, USB ports have been used to transfer data between mobile phones and personal computers as well as digital cameras and personal computers. Data transfer speeds of a serial port may be limited to 100 Kbps; while the USB standard supports a data transfer speed of 12 Mbps. In addition, USB does not require installation of complicated adapters.

USB enables 127 devices to be connected in a chain. In addition, users do not need additional software/hardware settings when connecting peripheral devices to a personal computer. USB also makes it possible to reduce the number of ports because all peripheral devices may be connected via the same port. USB enables a portable computer to be made in a small size by reducing the number of ports required. WUSB may include the advantages of wired USB, by using an arbiter-based wireless network to manage variations in a wireless network. In accordance with current WUSB standards, only an arbiter capable of allotting a channel to a WUSB device may become a WUSB host. Accordingly, only one WUSB host may exist within a single arbiter-based wireless network.

For example, there may be a plurality of personal computers constituting one arbiter-based wireless network. One personal computer acting as an arbiter operates a WUSB host so as to be connected with peripheral devices each supporting WUSB. In this case, if any personal computer wants to operate as a WUSB host, it may constitute an independent arbiter-based wireless network. Because the number of arbiter-based wireless networks capable of being within a given range may be limited, the number of WUSB hosts may be also limited. For example, in an arbiter-based wireless network following the IEEE 802.15.3 standard, the number of communication channels is limited to 4 within a given range (e.g., about 10 m). In addition, the IEEE 802.15.3 standard is limited to one piconet per communication channel. The IEEE standard also limits the maximum number of WUSB groups existing within a given range to four. For these reasons, conventional WUSB standards may present a problem in that a plurality of WUSB hosts may not be supported within a given range.

By use of the Ultra Wide Band (UWB) standard, the above-described WUSB, like a wired USB, supports transfer speeds of about 480 Mpbs within about 2 m and of about 110 Mbps within about 10 m. In addition, WUSB may have an architecture that allows up to 127 WUSB devices to be connected in a point-to-point manner using a spatially centered HUB. A conventional technique for establishing a WUSB network may adopt a start architecture similar to that of wired USB. With the start architecture, a host and a device may be connected in a one-to-one manner. In this case, all communication control may be managed by a host. The start architecture does not create significant problems within a conventional wired USB network, but mobile applications may be connected or disconnected frequently based on the distance from a device or another host. For example, the start architecture may not be flexible enough to establish network connections between devices during circumstances characteristic of mobile applications.

In addition, because WUSB devices may be not made to support a plurality of hosts, it may be difficult to configure a complex start network that may be necessitated within a mobile Personal Area Network (PAN) valuing mobility.

SUMMARY

Example embodiments are directed to provide a method enabling a plurality of hosts to access one device at the same time within a wireless universal serial bus network.

Example embodiments provide a wireless universal serial bus system that includes a device; a first host communicating with the device according to a wireless universal serial bus protocol; and a second host communicating with the device according to a wireless universal serial bus protocol, such that when the first host receives a beacon from the second host, the first host provides new host information read out from the beacon to the device.

Example embodiments provide a host communicating with a device according to a wireless universal serial bus (WUSB) protocol, the host comprising a central processing unit configured to process a WUSB protocol signal, and a beacon including a host information and a wireless transceiver electrically coupled to the central processing unit configured to transmit and receive the WUSB protocol signal and the beacon, wherein the beacon is transmitted and received from another host.

Example embodiments provide a device communicating with one or more hosts according to a wireless universal serial bus (WUSB) protocol, the device comprising a central processing unit configured to process a WUSB protocol signal and a transceiver electrically coupled to the central processing unit configured to transmit and receive the WUSB protocol signal to and from the one or more hosts.

Example embodiments provide a wireless universal serial bus system comprising a first host communicating with at least one second host, wherein the first host is configured to receive a beacon from the at least one second host, the beacon including new host information from the at least one second host.

Example embodiments provide a driving method of a wireless universal serial bus system that includes communicating between a first host and a device according to a wireless universal serial bus protocol; sending a beacon from a second host to the first host; and providing to the device new host information read out from the beacon by the first host.

BRIEF DESCRIPTION OF THE DRAWINGS

Example embodiments will be more clearly understood from the following brief description taken in conjunction with the accompanying drawings. FIGS. 1-10 represent non-limiting, example embodiments as described herein.

FIG. 1 is a block diagram showing a wireless universal serial bus system according to example embodiments.

FIG. 2 is an example timing diagram for describing operations of first to fourth hosts and devices illustrated in FIG. 1 according to example embodiments.

FIG. 3 is an example block diagram showing Distributed Reservation Protocol (DRP) illustrated in FIG. 2.

FIG. 4 is an example block diagram showing Micro-scheduled Management Command (MMC) illustrated in FIG. 3.

FIG. 5 is an example block diagram showing DATA illustrated in FIG. 3.

FIG. 6 is an example block diagram showing NEW_HOST_IE illustrated in FIG. 4.

FIG. 7 is an example flow chart for describing the operation of a host according to example embodiments.

FIG. 8 is an example flow chart for describing the operation of devices according to example embodiments.

Figure 1:
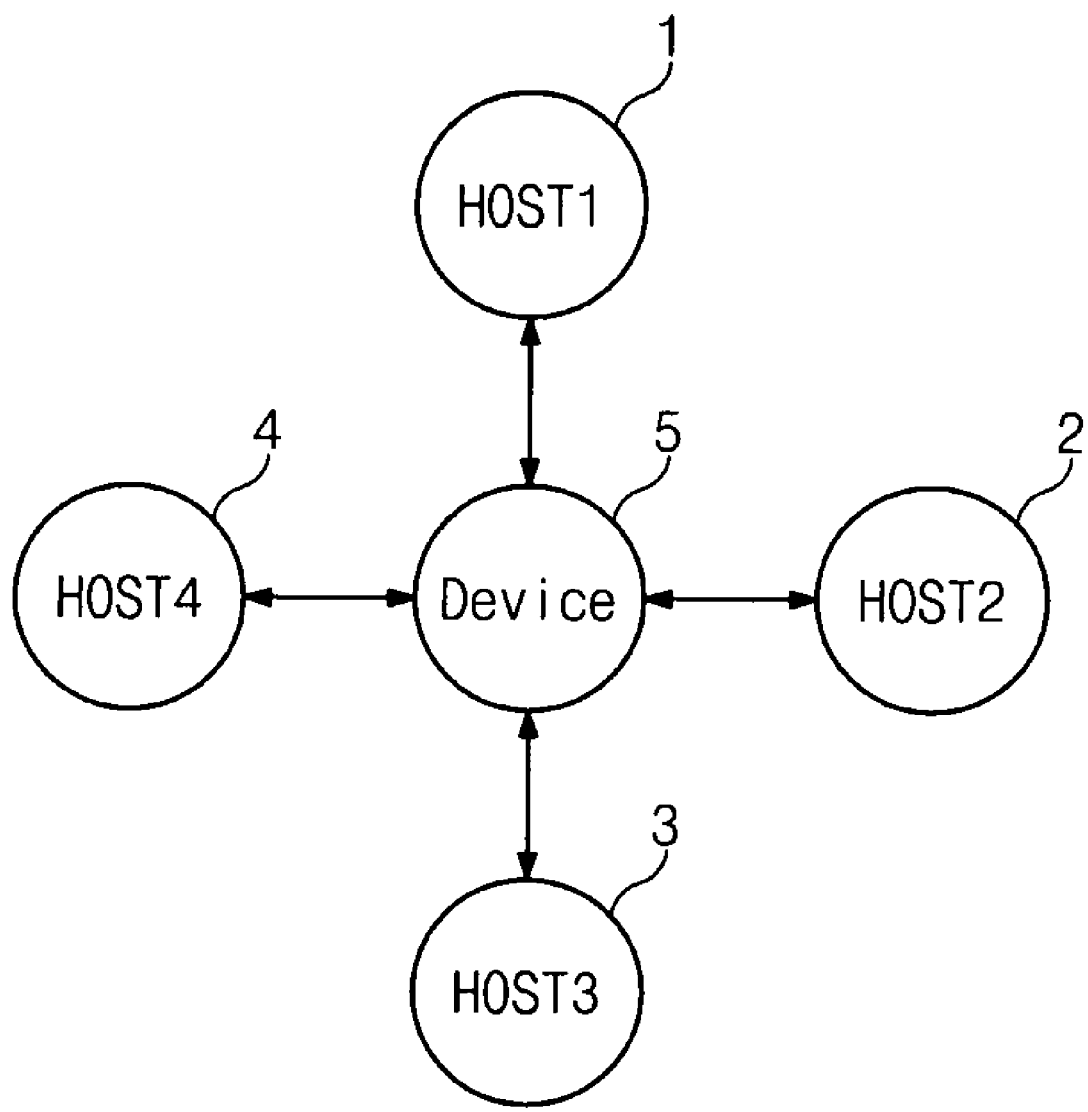

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
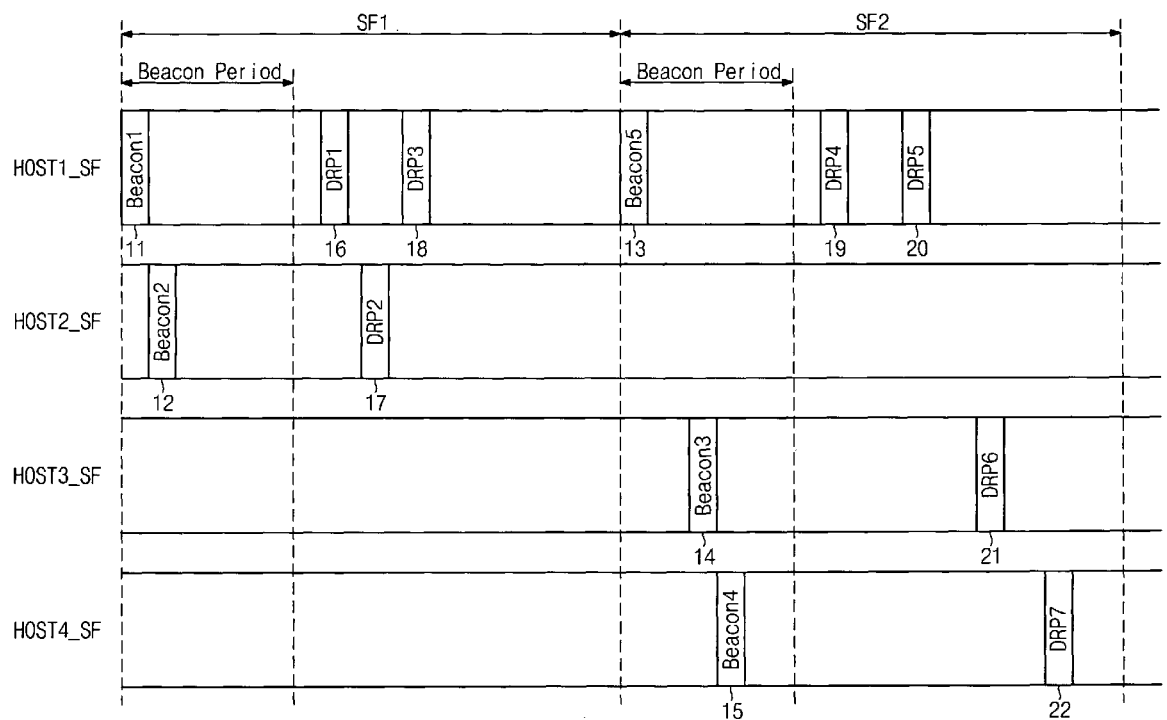

FIG. 1 is a block diagram showing a wireless universal serial bus system according to example embodiments, and FIG. 2 is an example timing diagram for describing operations of first to fourth hosts and devices illustrated in FIG. 1.

Referring to FIGS. 1 and 2, a wireless universal serial bus (WUSB) system (10) according to example embodiments includes four hosts (1-4) and a device (5).

HOST1 (1) is associated with Device (5) via a WUSB protocol before a first super frame (SF1) commences.

WiMedia refers to the ultra-wideband (UWB) common radio platform that enables high-speed (480 Mbps and beyond), low power consumption multimedia data transfers in a wireless personal area network (WPAN).

According to the WiMedia medium access control sublayer (MAC), the WUSB protocol is a data communication via superframes protocol. Based on Ultra Wide Band (UWB), the WUSB protocol uses a Distributed MAC having a superframe with a period of about 65 ms. With the Distributed MAC, each node may perform a host role.

If HOST2 (2) enters a WUSB network during the first superframe (SF1), HOST2 (2) notifies its existence to HOST1 (1) via Beacon2 (12) within a beacon period. For example, HOST1 (1) searches the existence of HOST2 (2) via Beacon2 (12) of HOST2 (2), and informs Device (5) of access start and end times for HOST2 (2) as being a new host. Information associated with access start and end times of a new host may be obtained from Beacon2 (12).

A beacon becomes a reference of time synchronization during a transmitting operation of all hosts at the WiMedia MAC. In the WiMedia MAC, Distributed Reservation Protocol (DRP) is a type of protocol used to allot a specific period of time to a specific device or a plurality of hosts by use of beacon. Micro-scheduled Management Command (MMC) is a type of packet that may be transmitted from a host and becomes a standard of all WUSB.

HOST1 (1) informs Device (5) of access start and end times for HOST2 (2), as being a new host, via NEW_HOST_IE (315) in the MMC of DRP1 (16).

The HOST1 (1) communicates with the Device (5) according to the WUSB protocol during the DRP1 (16) time period. HOST2 (2) communicates with Device (5) according to the WUSB protocol during the DRP2 (17) time period. For example, the DRP1 (16) time period may be a period that is time-allotted for data communication between HOST1 (1) and Device (5). The DRP2 (17) time period may be a period that is time-allotted for data communication between HOST2 (2) and Device (5).

The DRP3 (18) time period may be a period that is time-allotted for data communication between HOST1 (1) and HOST2 (2). HOST1 (1) may communicate with HOST (2) during the DRP3 (18) time period.

New host information may be provided to Device (5) from HOST1 (1), according to example embodiments. As a result the HOST1 (1) beacon priority is highest. Beacon priority is such that a host that firstly sends a beacon within a beacon period has the highest priority.

The beacon priority of HOST1 (1) is higher than HOST2 (2), and the beacon priority of HOST2 (2) is higher than HOST3 (3), according to example embodiments.

In addition, HOST2 (2) searches for existence of HOST1 (1) via Beacon1 (11) of HOST1 (1), and informs Device (5) of the access start and end times of HOST1 (1). For example, HOST1 (1) or HOST2 (2) may be capable of repetitively or selectively sending access start and end times of a new host.

During the second superframe (SF2), HOST2 (2) leaves the WUSB network, and HOST3 (3) and HOST4 (4) enter the WUSB network. HOST3 (3) and HOST4 (4) notify their existence to HOST1 (1) via Beacon3 (14) and via Beacon4 (15) within a beacon period. For example, HOST1 (1) searches the existence of HOST3 (3) and of HOST4 (4) via Beacon3 (14) and via Beacon4 (15) of HOST3 (3) and of HOST4 (4), and informs Device (5) of the access start and end times for HOST3 (3) and for HOST4 (4) as being new hosts.

HOST1 (1) informs Device (5) of the access start and end times for a new host via NEW_HOST_IE (315) in the MMC of DRP4 (19). The DRP4 (19) time period may be a period that is time-allotted for data communication between HOST1 (1) and Device (5). The DRP5 (20) time period may be a period that is time-allotted for data communication between HOST1 (1) and HOST3 (3). The DRP6 (21) time period may be a period that is time-allotted for data communication between HOST3 (3) and Device (5). The DRP7 (22) time period may be a period that is time-allotted for data communication between HOST4 and Device (5).

Figure 3:
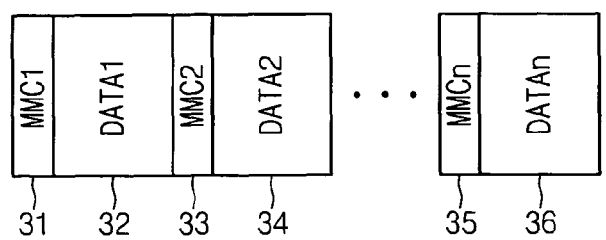
Figure 4:
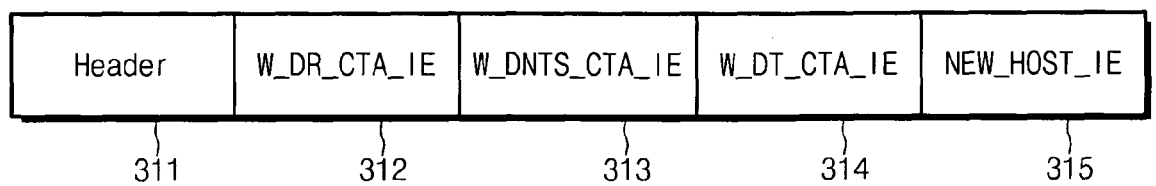
Figure 5:
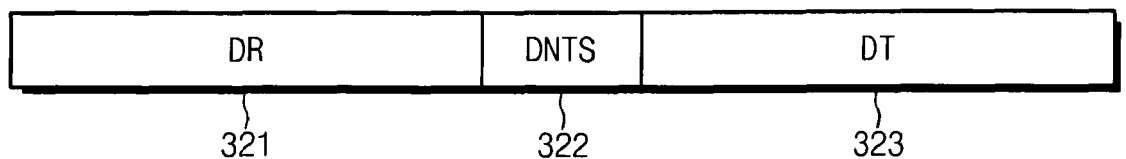

FIG. 3 is a block diagram showing Distributed Reservation Protocol (DRP) illustrated in FIG. 2, FIG. 4 is a block diagram showing Micro-scheduled Management Command (MMC) illustrated in FIG. 3, and FIG. 5 is a block diagram showing DATA illustrated in FIG. 3.

Referring to FIGS. 1 to 5, during the first superframe (SF1), superframe HOST1_SF of HOST1 (1) may include Beacon1 (11) and DRP1 (16) and DRP3 (18). Beacon1 (11) may include information of the start and end times of DRP1 (16) and information of the start and end times of DRP3 (18). Superframe HOST2_SF of HOST2 (2) may include Beacon2 (12) and DRP2 (17). Beacon2 (12) may include information of the start and end times of DRP2 (17).

Device (5) does not receive a host beacon directly, and may merely receive an MMC transmitted from a host. In order to prevent or reduce power consumption, Device (5) may be activated only during access periods of Host1 (1) and Host2 (2) by use of new host information received from MMC.

During the second superframe (SF2), superframe HOST1_SF of HOST1 (1) may include Beacon5 (13) and DRP4 (19) and DRP5 (20). Beacon5 (13) may include information of the start and end times of DRP4 (19) and information of the start and end times of DRP5 (20).

Continuously, during the second superframe (SF2), superframe HOST3_SF of HOST3 (3) may include Beacon3 (14) and DRP6 (21). Beacon3 (14) may include information of the start and end times of DRP6 (21). Superframe HOST4_SF of HOST4 (4) may include Beacon4 (15) and DRP7 (22). Beacon4 (15) may include information of the start and end times of DRP7 (22).

Continuing to refer to FIGS. 1 to 5, DRP1 (16) includes MMC1 (31) to MMCn (35) and DATA1 (32) to DATAn (36). For example, one DRP may have a plurality of MMC blocks and a plurality of data periods. DRP7 (17) to DRP7 (22) may be configured the same as DRP1 (16), and description thereof is thus omitted.

MMC1 (31) has Header (311), W_DR_CTA_IE (312), W_DNTS_CTA_IE (313), W_DT_CTA_IE (314), and NEW_HOST_IE (315). Header (311) may include MAC address information of a receiver (e.g., device), MAC address information of a transmitter (e.g., host), Ethernet type information, and the like.

W_DR_CTA_IE (312) sets a time period in that data may be received from Device (5), and W_DNTS_CTA_IE (313) sets a time period that may be used for Device (5) to inform a host to become ready to conduct data communication. W_DT_CTA_IE (314) sets a time period that the device sends data. For example, W_DR_CTA_IE (312) sets DR (321), W_DNTS_CTA_IE (313) sets DNTS (322), and W_DT_CTA_IE (314) sets DT (323).

NEW_HOST_IE (315) may be used to store information associated with start and end times of DRP with respect to each of newly added hosts. As new host information, NEW_HOST_IE (315) may be included only in the first MMC. For example, in case of example embodiments, host information changed within one superframe may be reflected to next superframe.

NEW_HOST_IE (315) as new host information may be included in all MMCs, according to example embodiments. Configuration of NEW_HOST_IE (315) is described more fully in FIG. 6.

Figure 6:
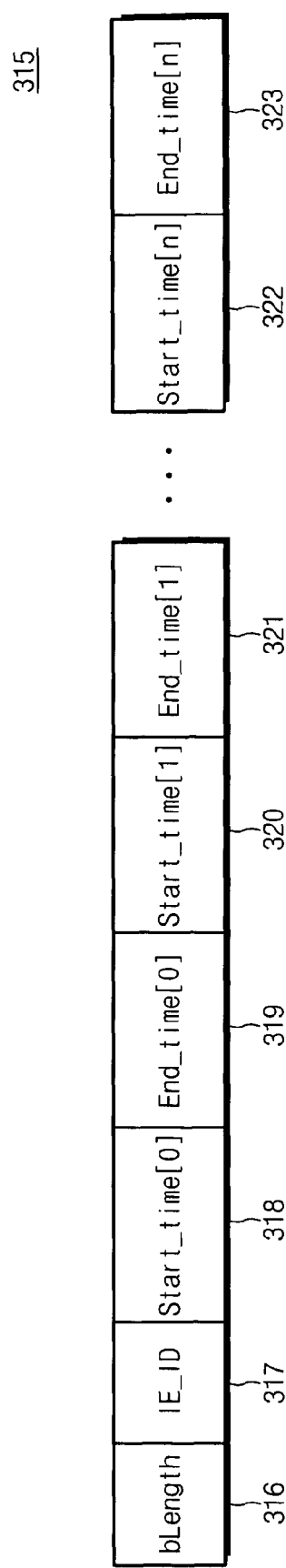

FIG. 6 is a block diagram showing NEW_HOST_IE (315) as illustrated in FIG. 4.

Referring to FIG. 6, NEW_HOST_IE (315) may include bLength (316), IE_ID (317), Start_time[0] (318), End_time [0] (319), Start_time[1] (320), End_time[1] (321), Start_time [n] (322), and End_time[n] (323).

bLength (316) indicates the total capacity of NEW_HOST_IE (315). IE_ID (317) shows the identification (ID) of NEW_HOST_IE (315). Start_time[0] (318) and End_time[0] (319) may include information associated with the start and end times of a DRP period of a host that sends MMC. Start_time[1] (320) and End_time[1] (321) may include information associated with the start and end times of a DRP time period for a host that is firstly added. Start_time[n] (322) and End_time[n] (323) may include information associated with the start and end times of a DRP time period of an nth added host. For example, information associated with the DRP of each of the added hosts may be sequentially accumulated in NEW_HOST_IE (315), according to example embodiments.

A detailed driving method for a WUSB system will be described with respect to the host and device sides, according to example embodiments. For example, the operation of a host will be described in FIG. 7, and the operation of a device will be described in FIG. 8.

Figure 7:
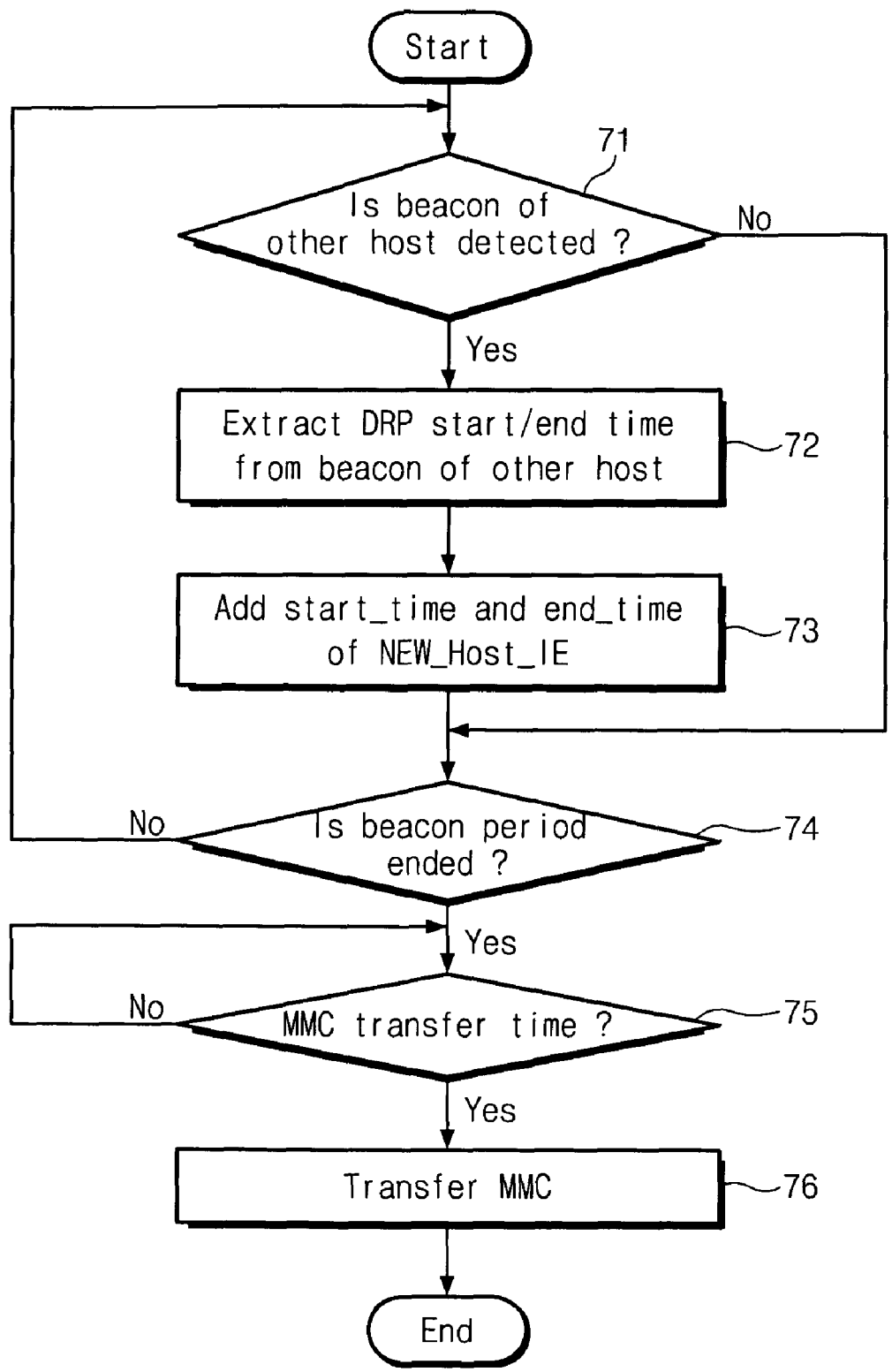

FIG. 7 is a flow chart for describing the operation of a host according to example embodiments.

Referring to FIGS. 1, 2, 4 and 7, HOST1 (1) may be associated with Device (5) in the WUSB protocol before the first superframe (SF1) commences. During the first superframe (SF1), if HOST2 (2) enters the WUSB network when HOST1 (1) communicates with Device (5) in accordance with the WUSB protocol, HOST2 (2) informs HOST1 (1) of its existence via Beacon2 (12) within a beacon period. HOST1 (1) checks whether Beacon2 (12) of HOST2 (2) is detected as in step 71. If Beacon2 (12) of HOST2 (2) is not detected, HOST1 (1) may check whether a beacon period may have ended as in operation 74.

If Beacon2 (12) is detected, HOST1 (1) reads out the information associated with the start and end times of the DRP time period of HOST2 (2) as in step 72. HOST1 (1) writes the start and end times of the DRP time period of HOST2 (2) in NEW_HOST_IE (315) of MMC as in step 73. HOST1 (1) checks whether a beacon period may have ended as in step 74. If the beacon period has not ended, the procedure returns to step 71, to check whether the beacon of another host is detected.

If the beacon period has ended, check whether a DRP period of HOST1 (1) has commenced. For example, HOST1 (1) waits until the DRP period of HOST1 (1) commences as in step 75. If the DRP period of HOST1 (1) commences, MMC including NEW_HOST_IE (315) as new host information may be sent to Device (5) as in step 76.

Figure 8:
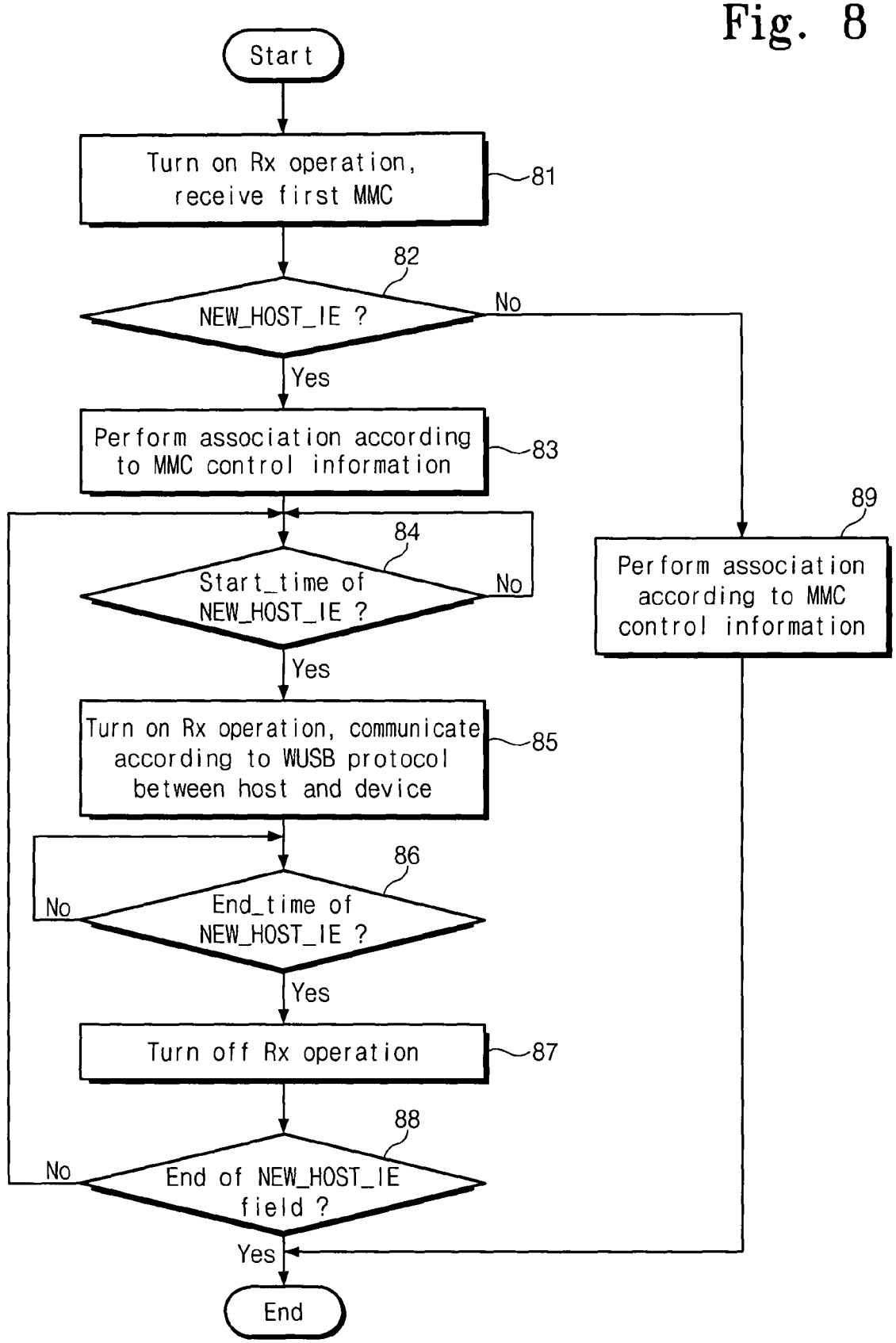

FIG. 8 is a flow chart for describing an operation of devices according to example embodiments.

A driving method of the WUSB system, according to example embodiments, shows connecting between HOST2 (2) and Device (5) at the state that HOST1 (1) may have been previously connected with Device (5).

Referring to FIGS. 1 to 4 and 8, Device (5) activates a reception state in order to receive MMC1 (31). Device (5) receives MMC1 (31) from HOST1 (1) as in step 81. Device (5) checks whether new host information (315) exists in MMC1 (31) as in step 82. If no new host information (315) exists in MMC1 (31), Device (5) may be associated with HOST1 (1) in accordance with received MMC control information as in step 89.

If HOST2 (2) enters the WUSB network when HOST1 (1) communicates with Device (5) in accordance with the WUSB protocol, HOST2 (2) informs HOST1 (1) of its existence via Beacon2 (12) within a beacon period. HOST1 (1) checks whether Beacon2 (12) of HOST2 (2) has been detected, and sends new host information (315) to Device (5) via MMC.

If new host information (315) exists within the MMC, Device (5) connects HOST1 (1) and HOST2 (2) according to control information of the received MMC as in step 83 in accordance with the WUSB protocol.

For example, DRP1 (16) of HOST1 (1) commences when MMC1 (31) is received. In other words, Device (5) activates a reception state in order to receive MMC1 as in step 81. Accordingly, the start time of DRP (16) elapses when MMC 1 shown in step 81 is received. In this example, new host information (315) exists for step 82. Device (5) connects HOST1 (1) and HOST2 (2) according to control information of the received MMC as in step 83 in accordance with the WUSB protocol. Device (5) needs to check whether a start time of DRP2 (17) becomes active and if so proceed to step 84. If no start time of DRP2 (17) becomes active, Device (5) waits until a start time of DRP1 (16) period of HOST1 (1) becomes active, otherwise, Device (5) may progress directly to step 85.

Device (5) was activated in step 81 in order to receive MMC from HOST1 (1). Accordingly, it may be unnecessary to activate a receiving operation of Device (5).

But, if the start time of DRP2 (17) time period of HOST2 (2) becomes active, Device (5) activates a receiving operation and, Device (5) communicates with the host according to the WUSB protocol as in step 85. Device (5) inactivates a receiving operation in step 87 when an end time of DRP1 (15) of HOST1 (1) elapses in step 86.

Device (5) checks whether an end time of the DRP1 (16) time period of HOST1 (1) becomes active. If not, Device (5) waits until the end time of the DRP1 (16) time period of HOST1 (1) elapses as in step 86. In the case of DRP2 (17) of HOST2 (2), Device (5) may be identical with that of DRP1 (16), and description thereof is thus omitted.

If the end time of DRP1 (16) time period of HOST1 (1) elapses, Device (5) inactivates the receiving operation of step 87. Device (5) then checks whether a new DRP period exists, based upon new host information (315) as in step 88. For example, the new host information (315) may include information associated with all the DRPs of HOST1 (1) and HOST2 (2). Accordingly, Device (5) checks if the next DRP period exists in the new host information (315).

For example, if an operation of DRP1 (16) of HOST1 (1) is completed, Device (5) waits up to the start time of DRP2 (17) of HOST2 (2) being the next DRP of step 84. Device (5) performs steps 85, 86, 87 and 88. Then, Device (5) waits up to the start time of DRP3 (18) of HOST1 (1) of step 84. Device (5) then performs steps 85, 86, 87 and 88. Device (5) completes the operation of one superframe if all DRP periods of the new host information are ended, and receives the first MMC sent from the first host of the next superframe of step 81.

A driving method of the WUSB system of example embodiments shows that connecting between HOST3 (3) and HOST4 (4) at the state that HOST1 (1) may have been previously connected with Device (5). For example, it may be assumed that HOST2 (2) leaves a network where HOST1 (1) and Device (5) may be connected according to the WUSB protocol and that HOST3 (3) and HOST4 (4) enter the network.

Continuing to refer to FIGS. 1, 2, 4 and 8, Device (5) activates a reception state in order to receive the first MMC. Device (5) receives the first MMC from HOST1 (1) at step 81. Device (5) checks whether the received MMC may include new host information (315) at step 82. If not, Device (5) may be associated with HOST1 (1) according to control information of the received MMC at step 89.

When HOST1 (1) communicates with Device (5) according to the WUSB protocol, if HOST2 (2) leaves the WUSB network and HOST3 (3) and HOST4 (4) enter the WUSB network, HOST3 (3) and HOST4 (4) notify HOST1 (1) of their existence via Beacon3 (14) and Beacon4 (15) within a beacon period. HOST1 (1) checks whether Beacon3 (14) and Beacon4 (15) of HOST3 (3) and HOST4 (4) are detected, and sends new host information (315) to Device (5) via MMC.

If the MMC includes new host information (315), Device (5) connects HOST1 (1) and HOST3 (3) and HOST4 (4) by the WUSB protocol based upon control information of the received MMC (83). For example, DRP1 (16) of HOST1 (1) commenced when the first MMC is received. In other words, Device (5) activates a reception state in order to receive the first MMC of step 81. Accordingly, the start time of DRP4 (19) elapses at the same time when the first MMC is received. In this case, Device (5) may progress to step 85. But, in the case of DRP5 (20) of HOST1 (1), Device (5) needs to check whether the start time of DRP2 (17) becomes active in step 84. Device (5) was activated in step 81 in order to receive MMC from HOST1 (1). Accordingly, it may be unnecessary to activate the receiving operation of Device (5).

But, if the start time of DRP5 (20) time period of HOST1 (1) becomes active; Device (5) activates a receiving operation. This is because Device (5) inactivates a receiving operation in step 87 when the end time of DRP4 (19) of HOST1 (1) elapses. Device (5) communicates with a host according to the WUSB protocol as in step 85.

Device (5) checks whether the end time of DRP4 (19) time period of HOST1 (1) elapses. If the end time of DRP4 (19) time period of HOST1 (1) does not elapse, Device (5) waits until the end time of DRP4 (19) time period of HOST1 (1) elapses for step 86. In the cases of DRP5 (20) of HOST1 (1), DRP6 (21) of HOST3 (3), and DRP7 (22) of HOST4 (4), Device (5) operates the same as the case of DRP4 (19), and description thereof is thus omitted.

If the end time of DRP4 (19) period of HOST1 (1) elapses, Device (5) inactivates the receiving operation in step 87. Device (5) checks whether the new host information (315) may further include new DRP time periods in step 88. For example, the new host information (315) may include information associated with all DRPs of HOST1 (1) and HOST3 (3) and HOST4 (4). Accordingly, Device (5) checks whether the new host information (315) further includes a next DRP time period. If all DRP time periods of the new host information (315) are terminated, Device (5) completes the operation of one superframe and receives the first MMC sent from the first host of the next superframe as in step 81.

Although example embodiments described herein include only hosts, the number of hosts is not intended to be limited to four, but to many. Accordingly, the WUSB system and its driving method according to example embodiments enable one device to be connected with a plurality of hosts.

The above-disclosed subject matter is to be considered illustrative, and not restrictive, and the appended claims are intended to cover all such modifications, enhancements, and other embodiments, that fall within the true spirit and scope of example embodiments. Thus, to the maximum extent allowed by law, the scope of example embodiments is to be determined by the broadest permissible interpretation of the following claims and their equivalents, and shall not be restricted or limited by the foregoing detailed description.

While example embodiments have been particularly shown and described, it will be understood by one of ordinary skill in the art that variations in form and detail may be made therein without departing from the spirit and scope of the claims.

What is claimed is:

1. A wireless universal serial bus system comprising:
a device;
a first host communicating with the device according to a wireless universal serial bus protocol; and
at least one second host communicating with the device according to a wireless universal serial bus protocol,
wherein when the first host receives a beacon from the at least one second host, the first host provides new host information read out from the beacon to the device.

2. The wireless universal serial bus system of claim 1, wherein the new host information includes a start time and an end time of an at least one second Distributed Reservation Protocol (DRP) time period with respect to the at least one second host.

3. The wireless universal serial bus system of claim 2, wherein the device communicates with the first host during a first DRP time period and with the at least one second host during the at least one second DRP time period.

4. The wireless universal serial bus system of claim 2, wherein the wireless universal serial bus protocol is based on superframe of WiMedia.

5. The wireless universal serial bus system of claim 4, wherein the first host updates the new host information every superframe.

6. The wireless universal serial bus system of claim 4, wherein the superframe includes the beacon and a first and the second DRP time periods each corresponding to the first and the at least one second hosts.

7. The wireless universal serial bus system of claim 6, wherein each of the first and the second DRP time periods includes a Micro-scheduled Management (MMC) block and data periods, wherein the first host adds the new host information transmitted from the beacon into a first block of the MMC block in the first DRP period before providing the new host information to the device.

8. A wireless universal serial bus system comprising:
a first host communicating with at least one second host,
wherein the first host is configured to receive a beacon from the at least one second host, the beacon including new host information from the at least one second host.

9. The wireless universal serial bus system of claim 8, wherein the new host information includes a start time and an end time of a second Distributed Reservation Protocol (DRP) with respect to the at least one second host.

10. The wireless universal serial bus system of claim 8, wherein a wireless universal serial bus protocol is based on superframe of WiMedia.

11. The wireless universal serial bus system of claim 10, wherein the first host updates the new host information every superframe.

12. The wireless universal serial bus system of claim 10, wherein the superframe includes the beacon and first and the second DRP time periods each corresponding to the first and the at least one second host.

13. The wireless universal serial bus system of claim 12, wherein each of the first and the second DRP time periods includes a Micro-scheduled Management (MMC) block and data periods.

14. A driving method of a wireless universal serial bus system comprising:
communicating between a first host and a device according to a wireless universal serial bus protocol;
sending a beacon from a second host to the first host; and
providing to the device new host information read out from the beacon by the first host.

15. The driving method of claim 14, wherein the new host information comprises a start time and an end time of a second Distributed Reservation Protocol (DRP) with respect to the second host.

16. The driving method of claim 15, wherein the device communicates with the first host during a first DRP period and with the second host during a second DRP period.

17. The driving method of claim 15, wherein the wireless universal serial bus protocol is based on superframe of WiMedia.

18. The driving method of claim 17, wherein the first host updates the new host information every superframe.

19. The driving method of claim 17, wherein the superframe comprises the beacon and the first and second DRP periods each corresponding to the first and second hosts.

20. The driving method of claim 19, wherein each of the first and second DRP periods comprises Micro-scheduled Management (MMC) and data periods, wherein the first host adds the new host information read out from the beacon into a first block of the MMC block in the first DRP period, so as to be provided to the device.

* * * * *